United States Patent

[11] 3,633,182

[72] Inventor James T. Koo
Walnutport, Pa.
[21] Appl. No. 853,103
[22] Filed Aug. 26, 1969
[45] Patented Jan. 4, 1972
[73] Assignee Bell Telephone Laboratories, Incorporated
Murray Hill, Berkeley Heights, N.J.

[54] CONTENT ADDRESSABLE MEMORY CELL
1 Claim, 3 Drawing Figs.

[52] U.S. Cl. 340/173 AM, 340/173 FF
[51] Int. Cl. G11c 11/40, G11c 15/00
[50] Field of Search 340/173 R, 174 TB; 307/88 LC

[56] References Cited

UNITED STATES PATENTS

| | | | |
|---|---|---|---|
| 2,976,519 | 3/1961 | Smith | 340/174 |
| 3,121,173 | 2/1964 | Radcliffe, Jr. | 307/88 |
| 3,123,719 | 3/1964 | Lee | 307/88 |
| 3,390,382 | 6/1968 | Igarashi | 340/173 |
| 3,418,639 | 12/1968 | Lee | 340/173 |

*Primary Examiner*—Stanley M. Urynowicz, Jr.
*Attorneys*—R. J. Guenther and Kenneth B. Hamlin ABSTRACT: A content addressable memory cell constructed from nine field effect transistors is disclosed in which the content addressing function is achieved by two of the nine field effect transistors. A memory is also disclosed to illustrate how the cell may be utilized. A second content addressable memory cell similar to the first is disclosed to show how two independent users can access the same cell.

INVENTOR
J. T. KOO
BY [signature]
ATTORNEY

CONTENT ADDRESSABLE MEMORY CELL

FIELD OF THE INVENTION

This invention relates to a memory cell and particularly to a memory cell suitable for use in a content addressable memory.

BACKGROUND OF THE INVENTION

In presently existing digital computers data is stored at known memory locations. To retrieve desired data, it is necessary to know where in the memory the data is stored. One must, therefore, keep track of where data is stored in the memory. A great deal of computer programmer time and effort is employed keeping track of data memory locations.

A content addressable memory is one in which data is stored at random locations in the memory along with a predetermined number of coded bits for indicating the nature of the data. To retrieve data in a content addressable memory, one need not know where the data is located. By merely applying the code for the data desired to the memory, the appropriate data can be retrieved.

The content addressable memory has a further advantage in that data can be retrieved on a search basis. A person searching need not know what data is stored in the memory. For example, if data relating to transistor technology were stored in a memory, a person wishing such data need not know that any, or how much, or what kind of data relating thereto was stored therein. He need only apply the code for transistor technology to the memory. All the data relating thereto would be retrieved. It should be apparent that codes for various classifications and subclassifications can be employed to generate a highly sophisticated retrieval system.

The concept underlying content addressable memories has been known for some time. No commercially acceptable system, however, has yet been developed.

One obstacle to achieving acceptable content addressable memories is the lack of a content addressable memory cell having suitable properties. One property necessary for a cell which would be suitable for a content addressable memory is simplicity. Many of the cells which have been proposed thus far which possess the functional properties necessary for a content addressable memory cell are complicated and employ a large number of components. The large number of components not only limits the speed of the cell, but also greatly increases the cost thereof compared with existing memory cells.

A content addressable memory cell which can achieve commercial success must not only be simple in construction and operation, but must also be capable of organization into a word organized random access memory without requiring extensive additional interconnecting circuitry. The cell should also be capable of performing at high speed with low-standby power consumption. A content addressable memory cell of a type which is quite simple is a cell described in a patent application in the name of T. E. Browne 3, having Ser. No. 828,934 and filed May 29, 1969.

BRIEF DESCRIPTION OF THE INVENTION

In accordance with the invention of this application, a memory cell comprising a data storage cell whose output terminals are connected to a pair of bit lines by nonlinear impedances is adapted for use in a content addressable memory by the addition of two controlled impedance devices. A control terminal of each controlled impedance device is connected to one of the output terminals of the data storage cell while one of a pair of controlled terminals of each controlled impedance device is connected to one of the bit lines. The remaining controlled terminals of the controlled impedance devices are connected together to provide a match output terminal.

In one embodiment a plurality of the content addressable memory cells is arranged in a word organized array. The match output terminals of the cells in each word are connected together to provide a word match output line. A nonlinear impedance is connected between each match output terminal and the word match output line to isolate the cells from each other thereby increasing the maximum signal swing on the word match output line.

DETAILED DESCRIPTION

Figure 1:
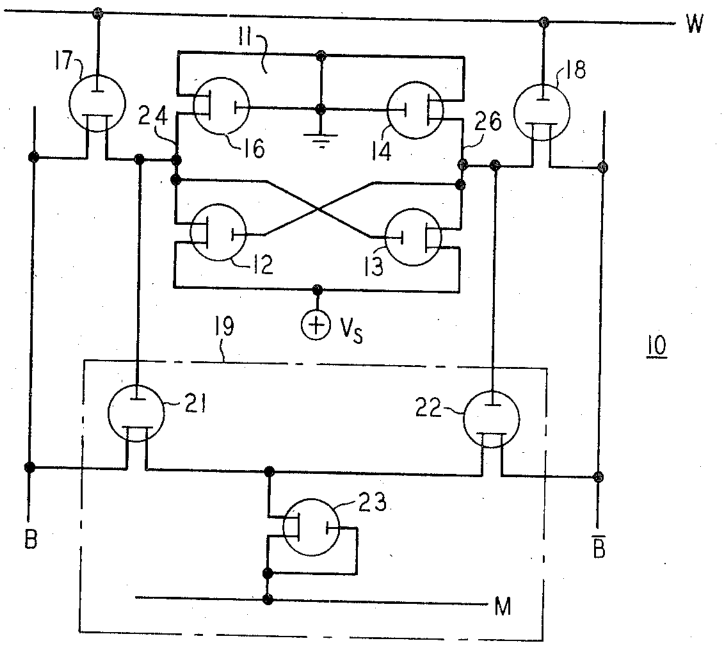
FIG. 1 is a schematic circuit drawing showing a content addressable memory cell built in accordance with the teaching of this invention.

Referring now to FIG. 1, we see a content addressable memory cell 10 built in accordance with the teachings of this invention. The content addressable memory cell 10 has three major portions: a storage cell or flip-flop 11 comprising four P-channel field effect transistors 12, 13, 14 and 16; read-write accessing circuitry including P-channel field effect transistors 17 and 18; and a content addressable accessing circuit 19 including P-channel field effect transistors 21, 22 and 23.

The flip-flop 11 is of a conventional design in which field effect transistors 12 and 13 are a cross-coupled pair with field effect transistors 14 and 16 serving as load impedances therefor. The junction of the field effect transistors 12 and 16 serve as a bit output terminal 24 while the junction of the field effect transistors 13 and 14 serve as a bit output terminal 26. As is well known, the signal on the bit output terminal 24 is always the complement of the signal on the bit output terminal 26.

The read-write accessing field effect transistors 17 and 18 are connected in a well-known manner between a pair of bit lines B and $\overline{B}$, and the bit output terminals 24 and 26, respectively. The gates of field effect transistors 17 and 18 are connected together by a word access line W.

Figure 3:
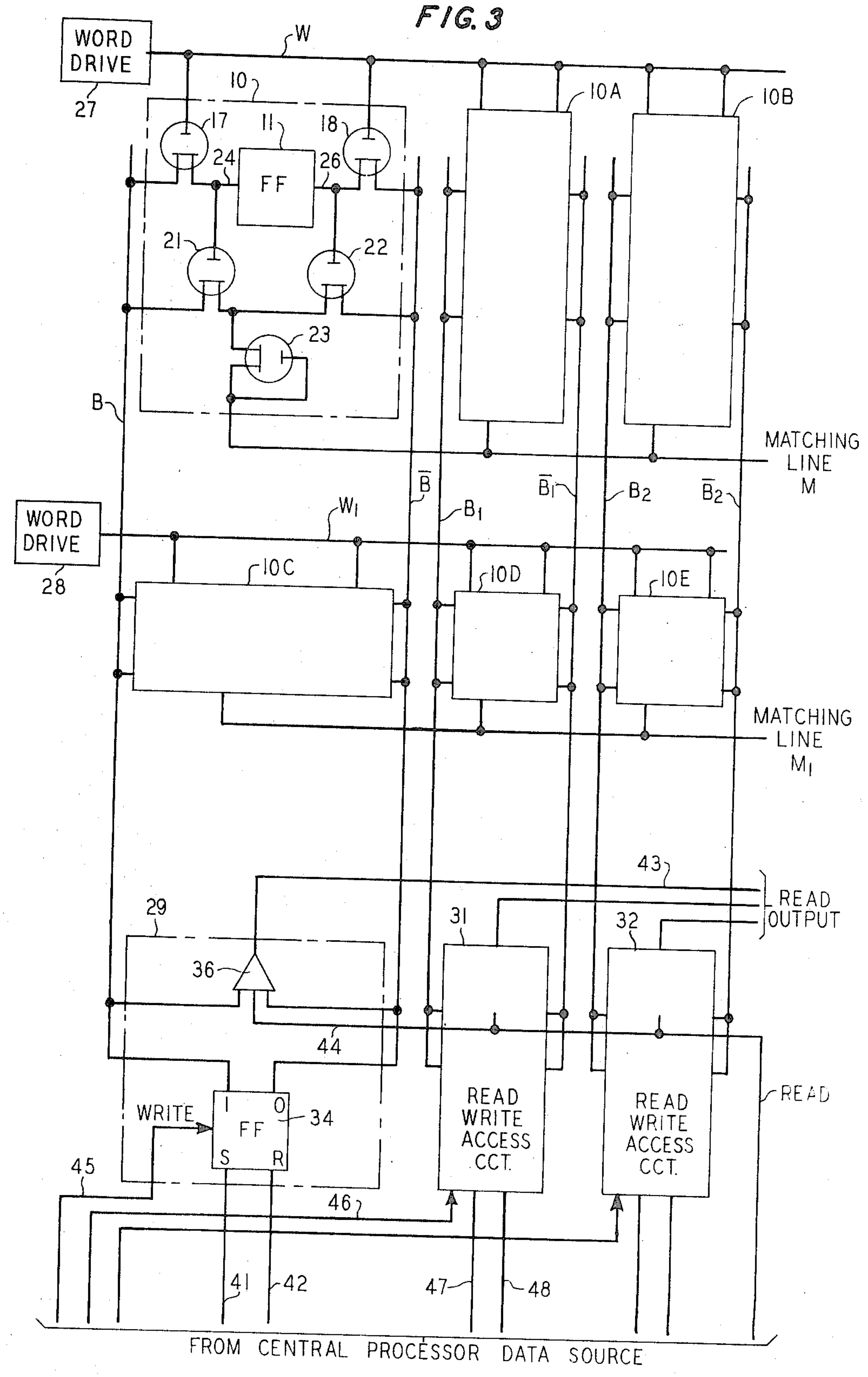
FIG. 3 is a drawing partially in schematic and partially in block diagram form showing the content addressable memory cell of FIG. 1 arranged in a word organized array.

In FIG. 3 a plurality of content addressable memory cells such as cell 10 are arranged in a word organized memory. Content addressable memory cells 10A, 10B, 10C, 10D, and 10E identical to the cell 10 are shown in FIG. 3 as blocks. The flip-flop 11 in content memory cell 10 is also shown as a block in FIG. 3.

In the memory of FIG. 3 there are two word rows having three bits each, therefore, the three cells 10, 10A, and 10B are connected together by word line W which is driven by a word drive circuit 27. The content addressable memory cells 10C, 10D and 10E are connected together by a word line $W_1$ which is driven by a word line circuit 28. The cells 10 and 10C have common bit lines B and $\overline{B}$ while the cells 10A and 10D share common bit lines $B_1$ and $\overline{B}_1$ and the cells 10B and 10E share common bit lines $B_2$ and $\overline{B}_2$. Each set of bit lines is connected to a read-write access circuit 29, 31, or 32. The details of read-write access circuits 31 and 32 are identical to that of read-write access circuit 29. This memory organization is well known and has been provided to demonstrate how the content addressable memory cell 10 of this invention fits into a word organized memory. The quiescent potential of the bit lines is substantially ground potential.

To write information into the cell 10, see FIGS. 1 and 3 together, the word line W is energized driving the field effect transistors 17 and 18 into conduction to provide low-impedance paths between the bit lines B and $\overline{B}$ and bit output terminals 24 and 26, respectively. A signal from a central processor enables via lead 45 a write flip-flop 34 to apply a drive voltage to one of the bit lines B or $\overline{B}$ in accordance with signals on a set lead 41 and a reset lead 42 thereby driving one of the bit output terminals 24 or 26 to the applied potential. The other bit output terminal 24 or 26 is brought to the complement of the applied voltage by the cross-coupling of the field effect transistors 12 and 13. If the flip-flop 11 is in the desired state when the write signals are applied, no change in state occurs.

To read the information out of the cell 10, the word line W is energized again bringing the field effect transistors 17 and 18 to their low-impedance conditions. The voltage across the bit lines B and $\overline{B}$ is sensed when a high-input impedance differential amplifier 36 is enabled by a signal on lead 44 from central processor to nondestructively sense the state of the flip-flop 11 providing an output signal on a lead 43.

It should be clear that during normal operation when the word line W is activated by word drive circuit 27, the three read-write access circuits 29, 31, and 32 are activated simultaneously to either read out of or write into the associative memory cells 10, 10A, and 10B comprising the word driven by word line W. In a like manner the cells 10C, 10D, and 10E are accessed by the same read-write access circuitry 29, 31, and 32 when word line $W_1$ is activated by word drive circuit 28.

When addressing a content addressable memory by content, all words are addressed simultaneously. For example, in FIG. 3 if all the information stored in the cells shown contained coded bits indicative of the nature of the data stored in the remainder of each word, the memory would be addressed by applying coded signals to the bit lines B, $\overline{B}$, $B_1$, $\overline{B}_1$, $B_2$, and $\overline{B}_2$ indicating what data is desired. All words containing the desired information will provide a signal on a matching line such as M and $M_1$. In the case of the cells of this invention, a match signal is a ground voltage while a nonmatch would be indicated by a positive voltage. The quiescent potential of the matched line M is ground.

To see how the cell operates during content addressing we refer again to FIG. 1, where we see that with junction 24 in a high, or positive voltage, state and junction 26 in a low, or ground, state, field effect transistors 21 and 22 will be off until the cell is interrogated by coded signals on the bit lines B and $\overline{B}$. To test the associative memory cell 10 for a match, assume that a positive voltage is applied to the bit line B and a negative voltage is applied to the bit line $\overline{B}$. Both of the transistors 21 and 22 remain off and provide open circuit impedances between the bit lines B and $\overline{B}$ and the transistor 23. The match line M remains at ground voltage, indicating a match. If, on the other hand, a low voltage is applied to the bit line B and the positive voltage is applied to the bit line $\overline{B}$, the transistor 22 turns on and the transistor 21 turns off. The positive voltage on the bit line $\overline{B}$ would be coupled through the transistors 22 and 23 to the match line M indicating a nonmatch. In this way, it is seen that the contents of the content addressable memory cell 10 can be indicated on the match line M by merely applying voltages to the bit lines B and $\overline{B}$. It is further seen that no power is consumed by the content addressable accessing circuit 19 except during matching operations. No switching time of devices is involved because the field effect transistors 21 and 22 are already in the states determined by the state of the flip-flop 11 when the signals are applied to the bit lines.

To further increase the versatility of the content addressable memory cell, a match indication on match line M can be provided no matter what the state of flip-flop 11. This is necessary so that a memory can be programmed to alter the number of tag code bits in each word. Matching without regard to the state of the flip-flop 11 is called "don't care matching." With the content addressable memory cell 10, this function is easily provided by providing low voltages to both bit lines B and $\overline{B}$. A low indication is therefore always provided on the match line M.

Looking again to FIG. 3, addressing for match is accomplished by activating the write portions of the read-write access circuits 29 and 31. This is done in response to information from the central processor activating leads 45 and 46 and sending code information on either leads 41 or 42 and leads 47 or 48. The read-write access circuit 32 is not activated so that low voltages are applied on the bit lines $B_2$ and $\overline{B}_2$ so that a match can occur no matter what the contents of the cells 10B and 10E are. It should be noted that the word drive circuits 27 and 28 are not activated during this accessing.

If the information in the cells 10 and 10A match the information being accessed, a low voltage will appear on the matching line M. If on the other hand one or more of the cells 10 or 10A contain the wrong information, a high voltage will appear on matching line M. By monitoring the matching lines M and M1, one can determine what words, if any, in the memory contain the desired data. The data contained therein would then be retrieved by normal reading of that memory location. It should be clear that the field effect transistor 23 is not necessary for operation of the memory but is provided merely for improved electrical isolation between each adaptive memory cell 10, 10A and 10B to prevent loading by a matched cell of a mismatched cell. It should also be clear that field effect transistor 23 could be replaced by a diode.

Other common memory cells can also be adapted for associative operation by the addition of a pair of switching devices such as field effect transistors 21 and 22. For example, any other flip-flops can be substituted for flip-flop 11 as can other nonlinear devices be substituted for the read-write accessing field effect transistors 17 and 18. It should also be clear that by switching the gates of field effect transistors 21 and 22 so that the gate of field effect transistor 21 is connected to junction 26 and the gate of field effect transistor 22 is connected to junction 24, the associative memory cell 10 would match with signals on bit lines B and $\overline{B}$ which are the complements of the previous matching signals.

Figure 2:
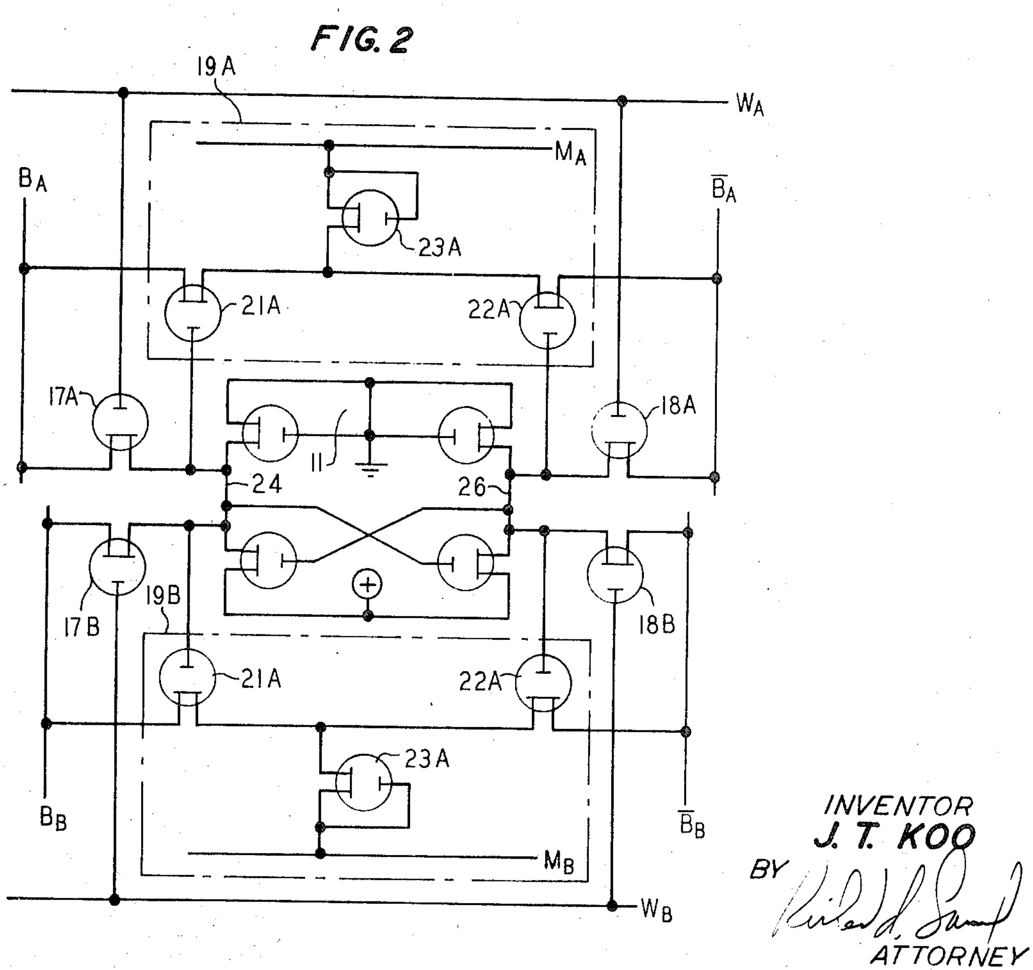
FIG. 2 is a schematic circuit drawing showing the content addressable memory cell of FIG. 1 modified to be independently accessed by two users.

FIG. 2 shows a content addressable memory cell which may be accessed by two users independently. The flip-flop portion 11 is identical to the flip-flop 11 in the content addressable memory cell 10. A first pair of field effect transistors 17A and 18A connect the junctions 24 and 26 to a pair of bit lines $B_A$ and $\overline{B_A}$ as transistors 17 and 18 in FIG. 1 connect the junctions 24 and 26 to the bit lines B and $\overline{B}$. The gates of field effect transistors 17A and 18A are connected by a word access line $W_A$. A content addressable accessing circuit 19A including field effect transistors 21A, 22A, and 23A are connected between the junctions 24 and 26, the bit lines $B_A$ and $\overline{B_A}$, and match line $M_A$ exactly as the content addressable accessing circuit 19 is connected in FIG. 1.

It should be seen, therefore, that the circuitry described thus far is identical to the circuit of FIG. 1 and can be connected in a memory as shown in FIG. 3.

A second pair of read-write accessing field effect transistors 17B and 18B are connected between the junctions 24 and 26 and a second set of bit lines $B_B$ and $\overline{B_B}$, respectively. The gates of the field effect transistors 17B and 18B are connected to a word line $W_B$. A second content addressable accessing circuit 19B is connected between the junctions 24 and 26, bit lines $B_B$ and $\overline{B_B}$, and a match line $M_B$. In this way, two complete sets of read-write and content addressable accessing circuits are connected to a single flip-flop 11 and two sets of bit, match and word lines. The bit lines $B_B$ and $\overline{B_B}$, the word line $W_B$ and the match line $M_B$ can be connected in an independent memory organization as shown in FIG. 3, providing a flip-flop 11 which can be independently accessed by two users.

Although this invention has been described with reference to a particular embodiment, it is to be understood that the arrangements disclosed are merely illustrative of the principles of my invention. Numerous modifications and other arrangements may be devised without departing from the spirit and scope of this invention.

What is claimed is:

1. In combination:

a plurality of data storage cells, each comprising means for exhibiting complementary signals at first and second terminals;

first and second bit access terminals;

first and second nonlinear impedance elements for connecting said first and second bit access terminals to said first and second terminals respectively;

first and second controlled impedance devices, each having a control terminal and first and second controlled terminals;

means for connecting said control terminals of said first and second controlled impedance devices to said first and second terminals respectively;

means for connecting said first controlled terminals of said first and second controlled impedance devices together to provide an output terminal; and means for directly connecting each of said second controlled terminals of said first and second controlled impedance devices to different ones of said first and second bit access terminals;

a match line for directly connecting the output terminals of the plurality of cells;

means for applying interrogation signals concurrently to said first and second bit access terminals of the plurality of cells; and one of said first and second controlled impedance devices responsive to the interrogation signals applied to its cell not matching information stored in that cell for conducting current from the associated bit access terminal to the match line.

* * * * *